(12) United States Patent
Bachar et al.

(10) Patent No.: US 11,287,081 B2
(45) Date of Patent: Mar. 29, 2022

(54) ROTATION MECHANISM WITH SLIDING JOINT

(71) Applicant: Corephotonics Ltd., Tel-Aviv (IL)

(72) Inventors: Gil Bachar, Tel Aviv (IL); Ephraim Goldenberg, Ashdod (IL); Noy Cohen, Tel Aviv (IL); Yiftah Kowal, Rehovot (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 16/975,723

(22) PCT Filed: Dec. 25, 2019

(86) PCT No.: PCT/IB2019/061360
§ 371 (c)(1),
(2) Date: Aug. 26, 2020

(87) PCT Pub. No.: WO2020/144528
PCT Pub. Date: Jul. 16, 2020

(65) Prior Publication Data
US 2021/0317941 A1    Oct. 14, 2021

Related U.S. Application Data

(60) Provisional application No. 62/809,897, filed on Feb. 25, 2019, provisional application No. 62/789,150, filed on Jan. 7, 2019.

(51) Int. Cl.
*F16M 11/20* (2006.01)
*F16M 11/12* (2006.01)
(Continued)

(52) U.S. Cl.
CPC ........... *F16M 11/125* (2013.01); *F16M 11/18* (2013.01); *G01D 5/145* (2013.01);
(Continued)

(58) Field of Classification Search
CPC ...... F16M 11/18; F16M 11/25; F16M 11/123; F16M 11/2035; F16M 11/205;
(Continued)

(56) References Cited

U.S. PATENT DOCUMENTS 2,450,875 A * 10/1948 Braddon ................ G01C 19/44
33/329
2,740,962 A * 4/1956 Hammond, Jr. ...... G01S 13/422
342/75
(Continued)

FOREIGN PATENT DOCUMENTS

CN      101276415 A      10/2008
CN      201514511 U      6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Tan Le
(74) *Attorney, Agent, or Firm* — Nathan & Associates; Nathan Menachem

(57) ABSTRACT

Rotation mechanisms for rotating a payload in two, first and second degrees of freedom (DOF), comprising a static base, a first rotation arm coupled mechanically to the static base through a first rotation joint and used for rotating the payload relative to the static base around a first rotation axis that passes through the first rotation joint, a second rotation arm coupled mechanically to the static base through a second rotation joint and used for rotating the payload relative to the static base around a second rotation axis that passes through the second rotation joint, and a follower member rigidly coupled to the payload and arranged to keep a constant distance from the second rotation arm, wherein the rotation
(Continued)

of the first arm rotates the payload around the first DOF and the rotation of the second arm rotate the payload around the second DOF.

13 Claims, 6 Drawing Sheets

(51) Int. Cl.

| | | |
|---|---|---|
| G05D 3/12 | (2006.01) | |
| G12B 5/00 | (2006.01) | |
| G01B 7/00 | (2006.01) | |
| G12B 9/08 | (2006.01) | |
| G05B 1/06 | (2006.01) | |
| F16M 11/04 | (2006.01) | |
| F16M 11/18 | (2006.01) | |
| G01D 5/14 | (2006.01) | |
| G02B 7/18 | (2021.01) | |
| G03B 17/56 | (2021.01) | |
| F16M 11/06 | (2006.01) | |

(52) U.S. Cl.
CPC ............ *G02B 7/1805* (2013.01); *F16M 11/04* (2013.01); *F16M 11/06* (2013.01); *F16M 11/123* (2013.01); *F16M 11/2035* (2013.01); *G01B 7/00* (2013.01); *G03B 17/561* (2013.01); *G12B 5/00* (2013.01)

(58) Field of Classification Search
CPC ........ F16M 11/06; F16M 11/04; F16M 11/12; G03B 17/561; G03B 17/565; G05D 3/12; G01D 5/145; G01B 7/00; G01B 7/004; G02B 7/1805; G12B 5/00; G12B 9/08
USPC .................. 248/583, 660, 664, 184.1, 284.1
See application file for complete search history.

(56) References Cited

U.S. PATENT DOCUMENTS

| | | | |
|---|---|---|---|
| 3,028,592 A * | 4/1962 | Parr | G01S 13/60 342/61 |
| 3,085,354 A | 4/1963 | Rasmussen et al. | |
| 3,584,513 A | 6/1971 | Gates | |
| 3,941,001 A | 3/1976 | LaSarge | |
| 4,199,785 A | 4/1980 | McCullough et al. | |
| 4,318,522 A * | 3/1982 | Appleberry | B64G 1/66 248/179.1 |
| 5,005,083 A | 4/1991 | Grage et al. | |
| 5,032,917 A | 7/1991 | Aschwanden | |
| 5,041,852 A | 8/1991 | Misawa et al. | |
| 5,051,830 A | 9/1991 | von Hoessle | |
| 5,099,263 A | 3/1992 | Matsumoto et al. | |
| 5,248,971 A | 9/1993 | Mandl | |
| 5,287,093 A | 2/1994 | Amano et al. | |
| 5,394,520 A | 2/1995 | Hall | |
| 5,436,660 A | 7/1995 | Sakamoto | |
| 5,444,478 A | 8/1995 | Lelong et al. | |
| 5,459,520 A | 10/1995 | Sasaki | |
| 5,657,402 A | 8/1997 | Bender et al. | |
| 5,682,198 A | 10/1997 | Katayama et al. | |
| 5,768,443 A | 6/1998 | Michael et al. | |
| 5,926,190 A | 7/1999 | Turkowski et al. | |
| 5,940,641 A | 8/1999 | McIntyre et al. | |
| 5,982,951 A | 11/1999 | Katayama et al. | |
| 6,101,334 A | 8/2000 | Fantone | |
| 6,128,416 A | 10/2000 | Oura | |
| 6,148,120 A | 11/2000 | Sussman | |
| 6,201,533 B1 | 3/2001 | Rosenberg et al. | |
| 6,208,765 B1 | 3/2001 | Bergen | |
| 6,268,611 B1 | 7/2001 | Pettersson et al. | |
| 6,549,215 B2 | 4/2003 | Jouppi | |
| 6,611,289 B1 | 8/2003 | Yu et al. | |
| 6,643,416 B1 | 11/2003 | Daniels et al. | |
| 6,650,368 B1 | 11/2003 | Doron | |
| 6,680,748 B1 | 1/2004 | Monti | |
| 6,714,665 B1 | 3/2004 | Hanna et al. | |
| 6,724,421 B1 | 4/2004 | Glatt | |
| 6,738,073 B2 | 5/2004 | Park et al. | |
| 6,741,250 B1 | 5/2004 | Furlan et al. | |
| 6,750,903 B1 | 6/2004 | Miyatake et al. | |
| 6,778,207 B1 | 8/2004 | Lee et al. | |
| 7,002,583 B2 | 2/2006 | Rabb, III | |
| 7,015,954 B1 | 3/2006 | Foote et al. | |
| 7,038,716 B2 | 5/2006 | Klein et al. | |
| 7,199,348 B2 | 4/2007 | Olsen et al. | |
| 7,206,136 B2 | 4/2007 | Labaziewicz et al. | |
| 7,248,294 B2 | 7/2007 | Slatter | |
| 7,256,944 B2 | 8/2007 | Labaziewicz et al. | |
| 7,305,180 B2 | 12/2007 | Labaziewicz et al. | |
| 7,339,621 B2 | 3/2008 | Fortier | |
| 7,346,217 B1 | 3/2008 | Gold, Jr. | |
| 7,365,793 B2 | 4/2008 | Cheatle et al. | |
| 7,411,610 B2 | 8/2008 | Doyle | |
| 7,424,218 B2 | 9/2008 | Baudisch et al. | |
| 7,509,041 B2 | 3/2009 | Hosono | |
| 7,533,819 B2 | 5/2009 | Barkan et al. | |
| 7,619,683 B2 | 11/2009 | Davis | |
| 7,738,016 B2 | 6/2010 | Toyofuku | |
| 7,773,121 B1 | 8/2010 | Huntsberger et al. | |
| 7,809,256 B2 | 10/2010 | Kuroda et al. | |
| 7,880,776 B2 | 2/2011 | LeGall et al. | |
| 7,918,398 B2 | 4/2011 | Li et al. | |
| 7,964,835 B2 | 6/2011 | Olsen et al. | |
| 7,978,239 B2 | 7/2011 | Deever et al. | |
| 8,115,825 B2 | 2/2012 | Culbert et al. | |
| 8,149,327 B2 | 4/2012 | Lin et al. | |
| 8,154,610 B2 | 4/2012 | Jo et al. | |
| 8,238,695 B1 | 8/2012 | Davey et al. | |
| 8,274,552 B2 | 9/2012 | Dahi et al. | |
| 8,390,729 B2 | 3/2013 | Long et al. | |
| 8,391,697 B2 | 3/2013 | Cho et al. | |
| 8,400,555 B1 | 3/2013 | Georgiev et al. | |
| 8,439,265 B2 | 5/2013 | Ferren et al. | |
| 8,446,484 B2 | 5/2013 | Muukki et al. | |
| 8,483,452 B2 | 7/2013 | Ueda et al. | |
| 8,514,491 B2 | 8/2013 | Duparre | |
| 8,547,389 B2 | 10/2013 | Hoppe et al. | |
| 8,553,106 B2 | 10/2013 | Scarff | |
| 8,587,691 B2 | 11/2013 | Takane | |
| 8,619,148 B1 | 12/2013 | Watts et al. | |
| 8,803,990 B2 | 8/2014 | Smith | |
| 8,896,655 B2 | 11/2014 | Mauchly et al. | |
| 8,976,255 B2 | 3/2015 | Matsuoto et al. | |
| 9,019,387 B2 | 4/2015 | Nakano | |
| 9,025,073 B2 | 5/2015 | Attar et al. | |
| 9,025,077 B2 | 5/2015 | Attar et al. | |
| 9,041,835 B2 | 5/2015 | Honda | |
| 9,137,447 B2 | 9/2015 | Shibuno | |
| 9,185,291 B1 | 11/2015 | Shabtay et al. | |
| 9,215,377 B2 | 12/2015 | Sokeila et al. | |
| 9,215,385 B2 | 12/2015 | Luo | |
| 9,270,875 B2 | 2/2016 | Brisedoux et al. | |
| 9,286,680 B1 | 3/2016 | Jiang et al. | |
| 9,344,626 B2 | 5/2016 | Silverstein et al. | |
| 9,360,671 B1 | 6/2016 | Zhou | |
| 9,369,621 B2 | 6/2016 | Malone et al. | |
| 9,413,930 B2 | 8/2016 | Geerds | |
| 9,413,984 B2 | 8/2016 | Attar et al. | |
| 9,420,180 B2 | 8/2016 | Jin | |
| 9,438,792 B2 | 9/2016 | Nakada et al. | |
| 9,485,432 B1 | 11/2016 | Medasani et al. | |
| 9,578,257 B2 | 2/2017 | Attar et al. | |
| 9,618,748 B2 | 4/2017 | Munger et al. | |
| 9,681,057 B2 | 6/2017 | Attar et al. | |
| 9,723,220 B2 | 8/2017 | Sugie | |
| 9,736,365 B2 | 8/2017 | Laroia | |
| 9,736,391 B2 | 8/2017 | Du et al. | |
| 9,768,310 B2 | 9/2017 | Ahn et al. | |
| 9,800,798 B2 | 10/2017 | Ravirala et al. | |
| 9,851,803 B2 | 12/2017 | Fisher et al. | |
| 9,894,287 B2 | 2/2018 | Qian et al. | |

(56) References Cited

U.S. PATENT DOCUMENTS

| | | |
|---|---|---|
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0033434 A1* | 3/2002 | Furuta ............... F16M 11/123 248/178.1 |
| 2002/0063711 A1 | 5/2002 | Park et al. |
| 2002/0075258 A1 | 6/2002 | Park et al. |
| 2002/0084396 A1* | 7/2002 | Weaver ............... F16M 11/10 248/278.1 |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0050139 A1* | 3/2007 | Sidman ............... G03B 17/561 318/649 |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0079101 A1* | 4/2010 | Sidman ............... F16M 11/041 318/649 |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |

(56) References Cited

U.S. PATENT DOCUMENTS

| | | |
|---|---|---|
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2019/0121103 A1 | 4/2019 | Bachar et al. |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

International Search Report and Written Opinion in related PCT application PCT/IB2019/061360, dated Apr. 27, 2020.

* cited by examiner

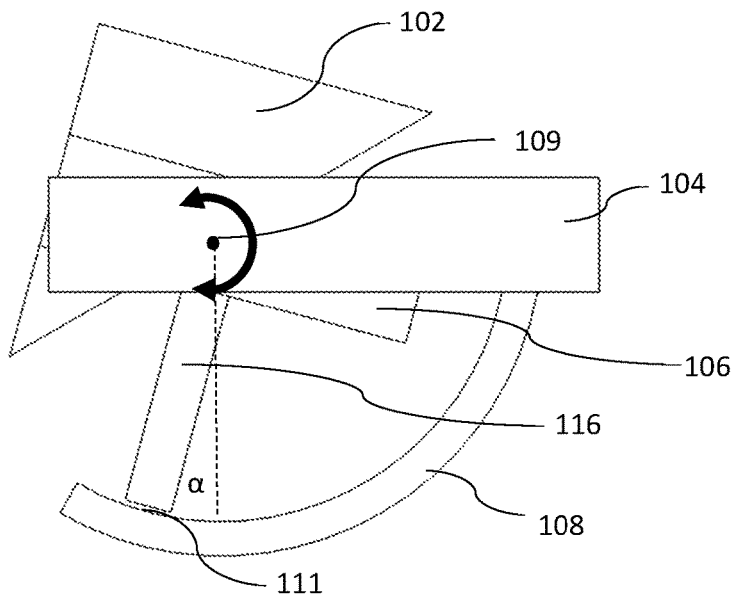
FIG. 1D
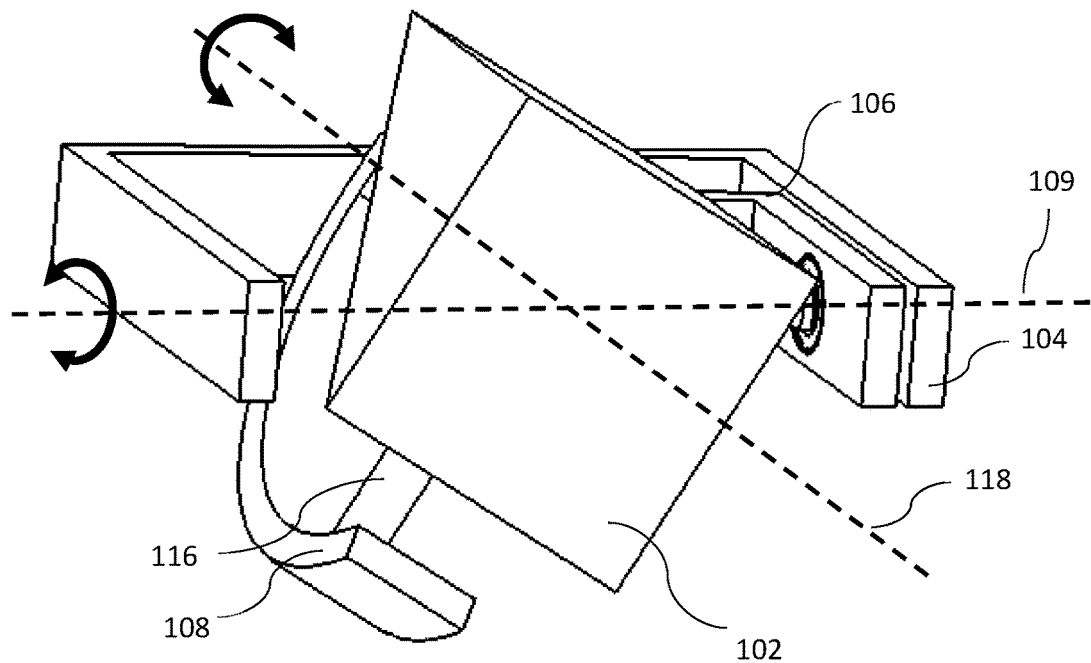
FIG. 1E
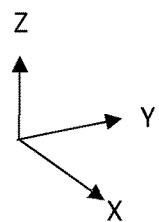

ROTATION MECHANISM WITH SLIDING JOINT

CROSS REFERENCE TO RELATED APPLICATIONS

This application is a 371 application from international patent application PCT/IB2019/061360 filed on Dec. 25, 2019, which claims priority from US Provisional Patent Applications No. 62/789,150 filed on Jan. 7, 2019 and No. 62/809,897 filed on Feb. 25, 2019, both of which are expressly incorporated herein by reference in their entirety.

FIELD

Embodiments disclosed herein relate in general to rotation mechanism and in particular to rotation mechanisms for various elements in small digital cameras included in electronic devices.

BACKGROUND

Cameras for surveillance, automotive, etc. include mechanisms that enable advanced optical function such as optical image stabilization (OIS) and/or scanning the camera field of view (FOV). Such mechanisms may actuate (e.g. displace, shift or rotate) an optical element (e.g. lens, image sensor, prism, mirror or even an entire camera) to create the desired optical function. Rotation mechanisms for rotating a payload (e.g. an optical element as above) in two degrees of freedom (DOF) are known. In known mechanisms in which one DOF is an internally rotating DOF and the other DOF is an external DOF, there is normally a problem in that the internally rotating DOF has its rotation axis rotated by the external DOF (Gimbal design). Known rotation mechanisms that solve the Gimbal problem use two fixed (not rotating) motors with more than three bearings or two rotating motors with two bearings.

SUMMARY

Aspects of embodiments disclosed herein relate to rotation mechanisms for rotating a payload in two DOFs. We propose a method of having two rotation axes around two rotation points.

In various exemplary embodiments there are provided rotation mechanisms for rotating a payload in two, first and second DOFs, comprising a static base, a first rotation arm coupled mechanically to the static base through a first rotation joint and used for rotating the payload relative to the static base around a first rotation axis that passes through the first rotation joint, a second rotation arm coupled mechanically to the static base through a second rotation joint and used for rotating the payload relative to the static base around a second rotation axis that passes through the second rotation joint, and a follower member rigidly coupled to the payload and arranged to keep a constant distance from the second rotation arm, wherein the rotation of the first arm rotates the payload around the first DOF and the rotation of the second arm rotate the payload around the second DOF.

In some embodiments, the follower member is a magnetic member separated from the second rotation arm by a constant air-gap.

In some embodiments, the payload is coupled mechanically to the first rotation arm through an inner rotation joint.

In some embodiments, a rotation mechanism further comprises a first motor for rotating the payload relative to the static base around the first rotation axis and a second motor for rotating the payload relative to the static base around the second rotation axis, wherein the first and second motors are rigidly attached to the static base In some embodiments, the second rotation arm is a ring section centered around the first rotation axis.

In some embodiments, the rotation mechanism further comprises at least one sensing mechanism for determining a position of the payload.

In some embodiments, a sensing mechanism comprises at least one pair of a magnet and a Hall sensor.

In some embodiments, a sensing mechanism is operable to determine a position of the payload relative to the static base in the first and second DOFs.

In some embodiments, a pair of a magnet and a Hall sensor comprises a first pair of a magnet and a Hall sensor that allows determination of a rotation of the payload around the first DOF, and a second pair of a magnet and a Hall sensor that allows determination of a rotation of the payload around the second DOF.

In some embodiments, determinations of the position of the payload relative to the static base in the two DOFs are decoupled from each other.

BRIEF DESCRIPTION OF THE DRAWINGS

Aspects, embodiments and features disclosed herein will become apparent from the following detailed description when considered in conjunction with the accompanying drawings, in which:

FIG. 1D shows in side view the mechanism of FIG. 1A at a rotated position around the first rotation axis;

FIG. 1E shows the rotation of a second rotation arm in the mechanism of FIG. 1A around a second rotation axis;

DETAILED DESCRIPTION

Figure 1A:
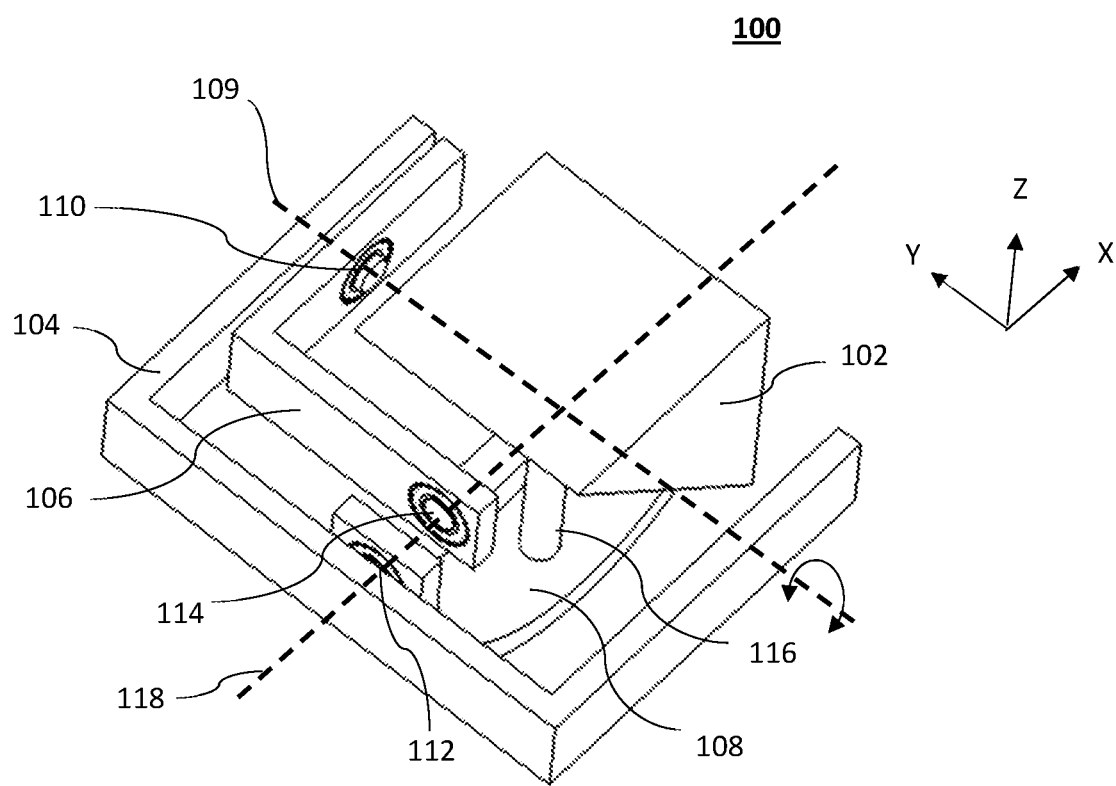
FIG. 1A shows schematically in a perspective view an embodiment of a rotation mechanism for rotating a payload in two DOFs disclosed herein, at zero position.

FIG. 1A shows schematically in a perspective view an embodiment of a rotation mechanism (or simply "mechanism") disclosed herein and numbered 100. Mechanism 100 is used for rotating a payload 102 in two DOFs disclosed herein, at zero position (initial position, without any actuation, not rotated). An exemplary XYZ coordinate system shown applies also to all following perspective views. Payload 102 is shown as a prism, but may be any element, and in particular any optical element, such as (and not limited to) a lens, an image sensor, a prism, a mirror or an entire camera. Mechanism 100 includes a static base 104 (i.e. a fixed base that does not move), a first rotation arm 106, a second rotation arm 108 and a magnetic follower 116. First rotation arm 106 can rotate relative to static base 104 around a first rotation axis 109 (shown exemplarily in the Y direction). First rotation axis 109 passes through a first rotation joint 110 that couples first rotation arm 106 mechanically with static base 104 (e.g. using a ball bearing). Second rotation arm 108 has a shape of a circle section with a center on a first rotation axis 109. A second rotation axis 118 passes through a second rotation point 112 that mechanically connects second rotation arm 108 with static base 104 (e.g. using a ring ball bearing). Second rotation arm 108 can rotate relative to static base 104 around second rotation axis 118 (shown exemplarily in the X direction). The first and second rotation axes may be perpendicular to each other. Magnetic follower 116 may made of a permanent (fixed) magnet (or at least the tip facing second rotation arm is made of a permanent magnet). Second rotation arm 108 may be made of a ferromagnetic material. Alternatively, the second rotation arm may be made of a rigid material such as a plastic material or a non-ferromagnetic metal covered with a ferromagnetic material on a side facing magnetic follower 116. Magnetic follower 116 is distanced from second rotation arm 108 by an air-gap 111 (FIG. 1C), and allows payload 102 to follow second rotation arm 108 without having magnetic follower 116 touch second rotation arm 108 directly.

First rotation arm 106 and second rotation arm 108 can be rotated relative to rotation joints 110 and 112 respectively (each arm around one rotation point). The rotation can be performed by any motor (e.g. stepper, DC, brushless, VCM, etc.). An inner rotation point 114 connects payload 102 to first rotation arm 106 (e.g. using ring ball bearing) and allows payload 102 to rotate in a second DOF (see FIG. 1E). First rotation arm 106, first rotation joint 110 and inner rotation point 114 are similar to elements of a gimbal. Note that inner rotation point 114 is on second rotation axis 118 at zero point (as seen in FIG. 1A) but when first rotation arm 106 is rotated inner rotation point 114 rotates with it and is shifted from second rotation axis 118, as seen for example in FIG. 2B.

Figure 1B:
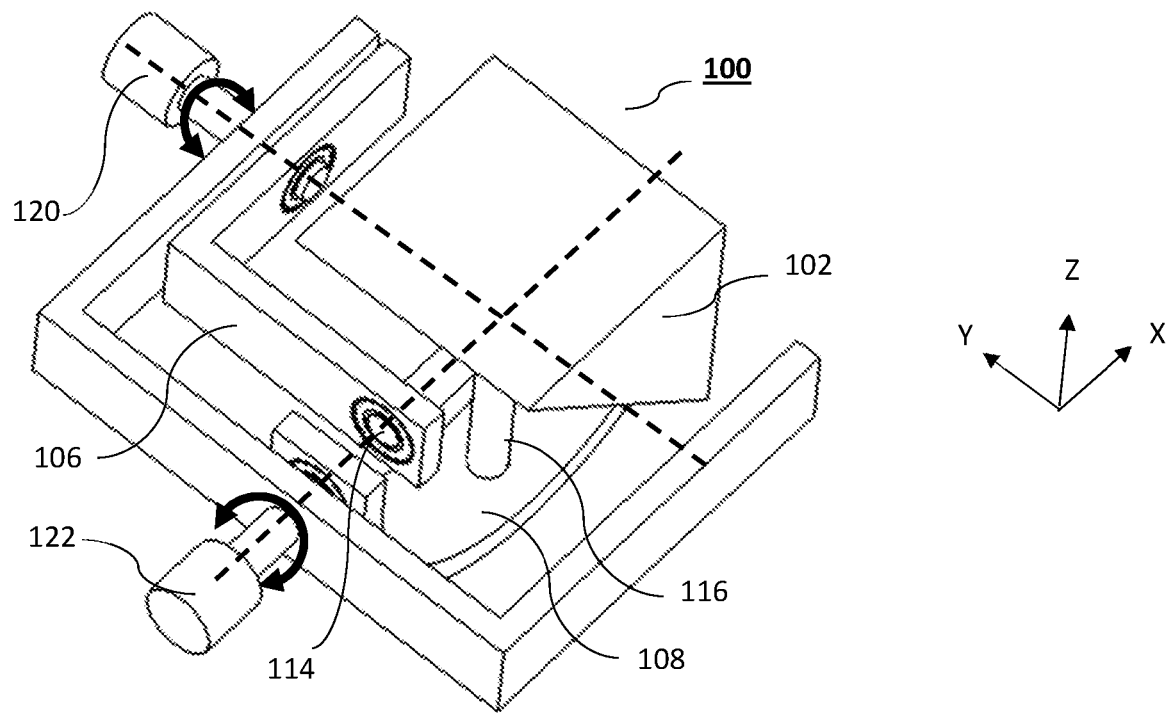
FIG. 1B shows the mechanism of FIG. 1A coupled with exemplary first and second motors.

FIG. 1B shows mechanism 100 coupled with exemplary first and second motors 120 and 122, which drive a rotation movement around the first and second rotation axes respectively. Advantageously, motors 120 and 122 are stationary relative to static base 104. In other embodiments, motors 120 and 124 may have different shapes and sizes, may be equal to one another or different in size, technology of actuation, etc.

Figure 1C:
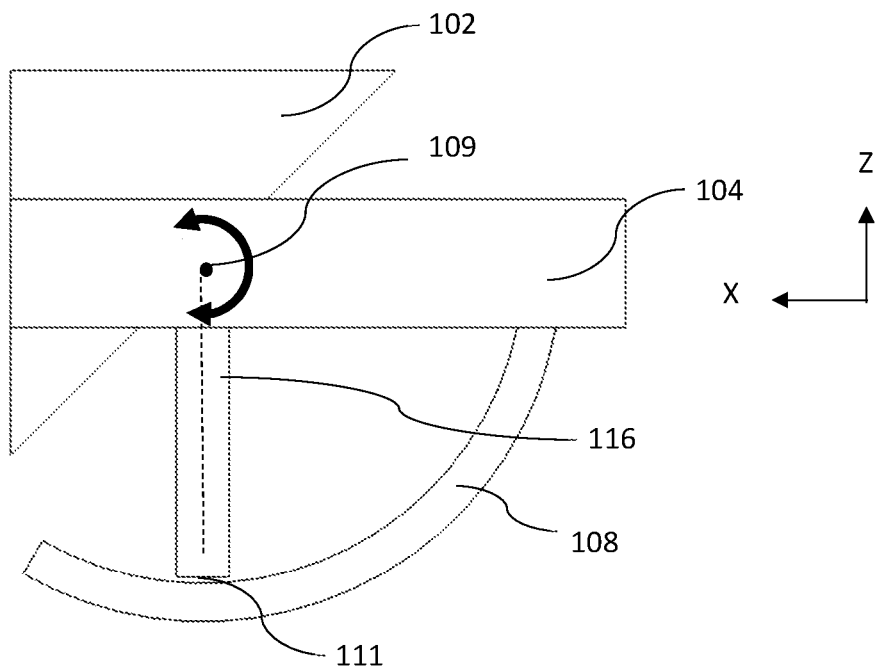
FIG. 1C shows in side view the mechanism of FIG. 1A at zero (non-rotated) position.

FIG. 1C shows mechanism 100 in a zero, non-rotated position (same as in FIG. 1A), while FIG. 1D shows mechanism 100 in a second, rotated position. Both FIGS. 1C and 1D are given in a side view in an exemplary X-Z plane (looking from positive to negative Y direction). In FIG. 1D, first rotation arm 106 is rotated around first rotation axis 109 (e.g. using first motor 120) relative to the base 104 and payload 102 rotates with it. Magnetic follower 116 stays distanced from second rotation arm 108 by a constant distance (air-gap 111). The rotation around first rotation point may be in any angle α. The angle limitation shown in FIGS. 1A-E is due only to the length of second rotation arm 108, which as shown is about a quarter of a circle in length. In other embodiments, the second rotation arm may be a complete circle, such that rotation of the first rotation arm around the first rotation axis may be up to 360 degrees.

FIG. 1E shows the rotation of second rotation arm 108 (e.g. using second motor 122) around the second rotation axis. Magnetic follower 116 is pulled to second rotation arm 108 by the magnetic force and thus rotates with it and rotates payload 102 relative to first rotation arm 106 around inner rotation point 114 in the second DOF. The rotation of the magnetic follower is independent of the rotation of first rotation arm 106 around first rotation axis 109 in the first DOF, because magnetic follower 116 is pulled to the second rotation arm 108 equally in all positions along first DOF. Magnetic follower 116 following second rotation arm 108 forms a "sliding joint", e.g. a joint that allows magnetic follower 116 to follow second rotation arm 108 in one (first) DOF while sliding without interference in a second DOF.

Figure 2A:
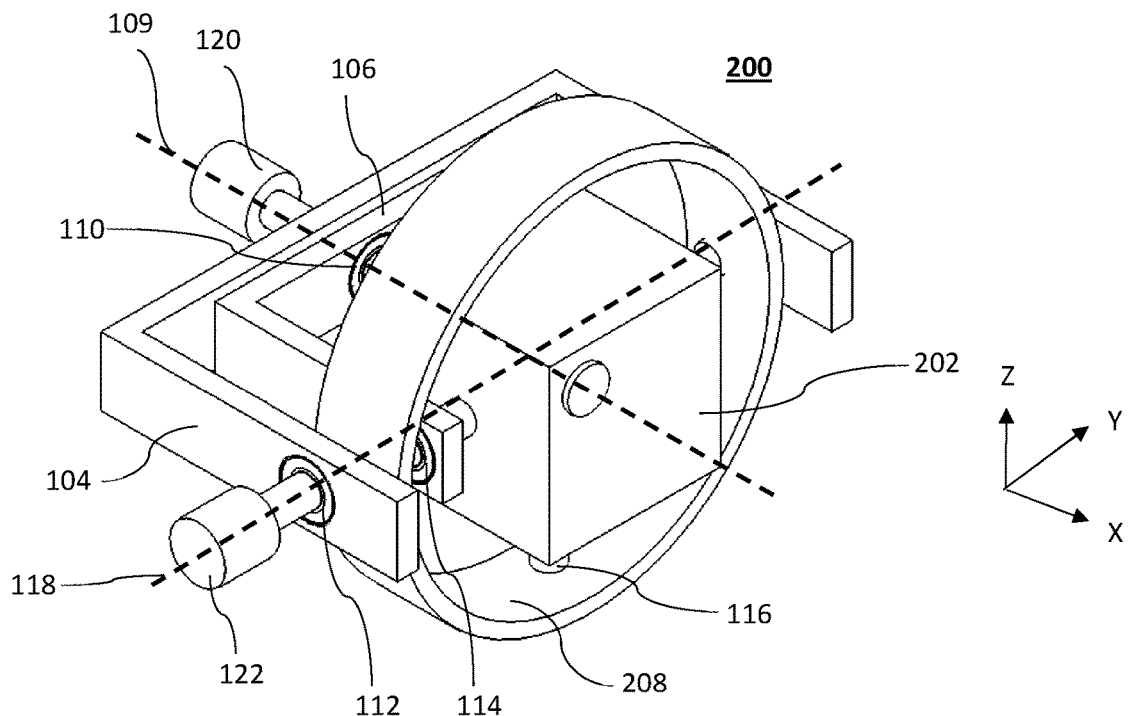
FIG. 2A shows schematically in a perspective view another embodiment of a rotation mechanism for rotating a payload in two DOFs disclosed herein, at zero position.
Figure 2B:
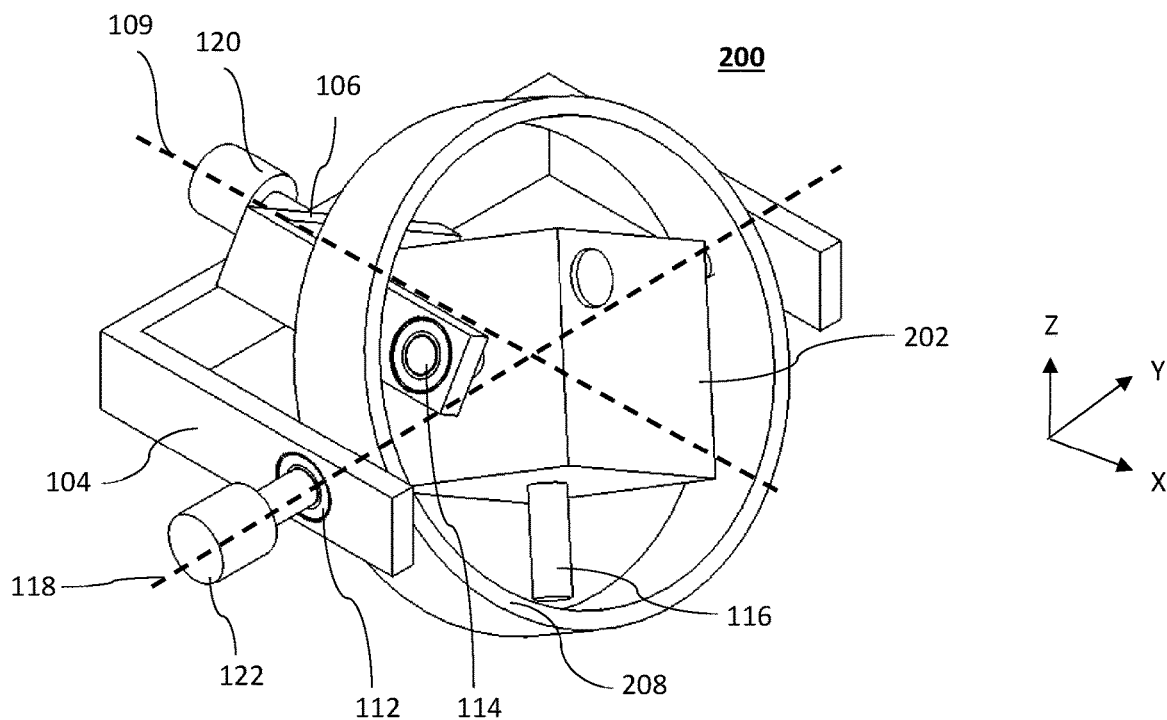
FIG. 2B shows in side view the mechanism of FIG. 2A at a rotated position, around both rotation axes.

FIGS. 2A and 2B show in perspective views another embodiment of a rotation mechanism disclosed herein and numbered 200. Mechanism 200 is similar to mechanism 100, with identical parts in both mechanisms numbered with identical numerals. In mechanism 200, the payload is a exemplarily a camera 202, and a second rotation arm 208 is a full circle, which enables rotation around the first rotation axis by 360 degrees. In FIG. 1A, mechanism 200 is shown in a rest (non-rotated) position, while in FIG. 1B, mechanism 200 is shown in position rotated by 30 degrees from the rest position.

Figure 3A:
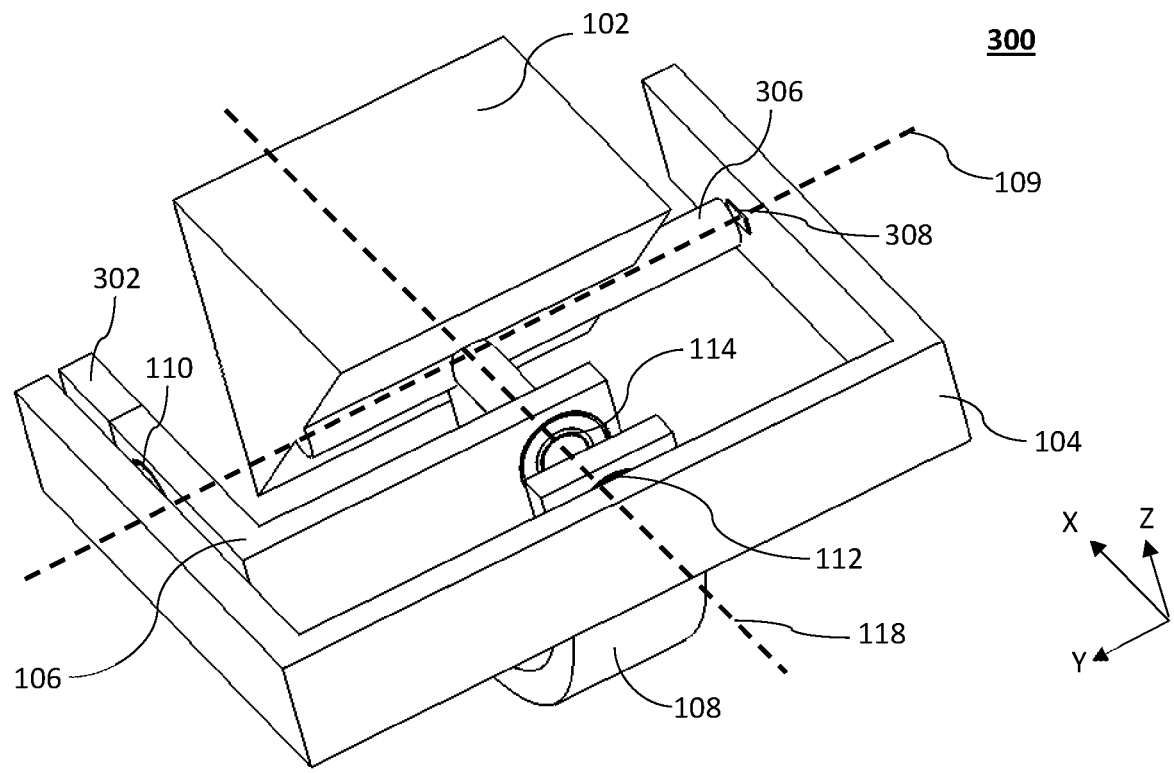
FIG. 3A shows schematically in a perspective view yet another embodiment of a rotation mechanism for rotating a payload in two DOFs disclosed herein, at zero position.
Figure 3B:
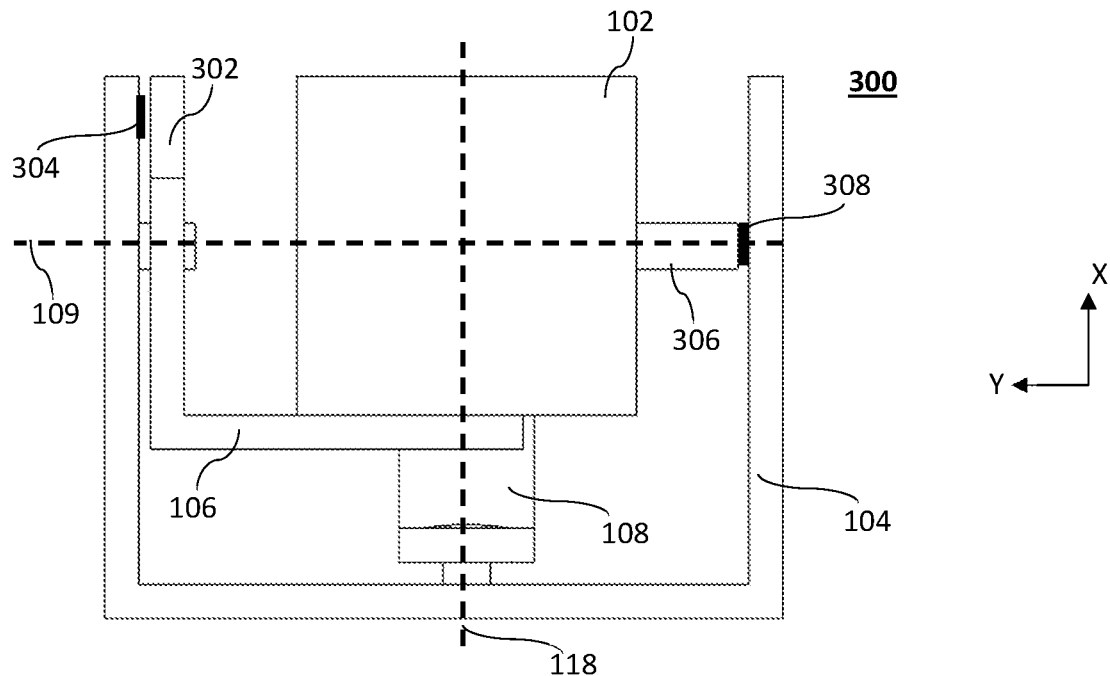
FIG. 3B shows the mechanism of FIG. 2A in a top view.
Figure 3C:
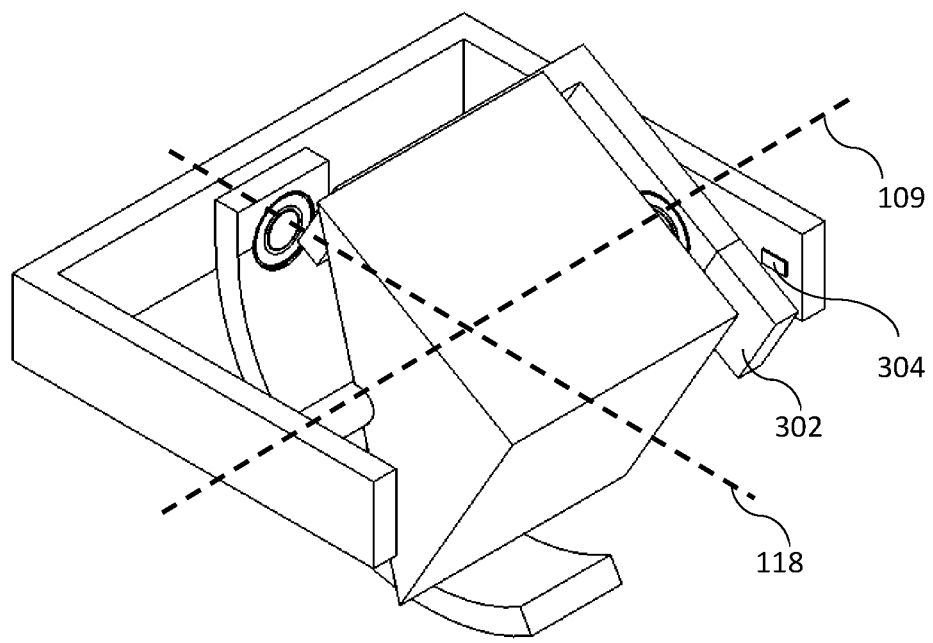
FIG. 3C shows one perspective view of an exemplary case in which the first rotation arm is rotated around the first DOF.
Figure 3D:
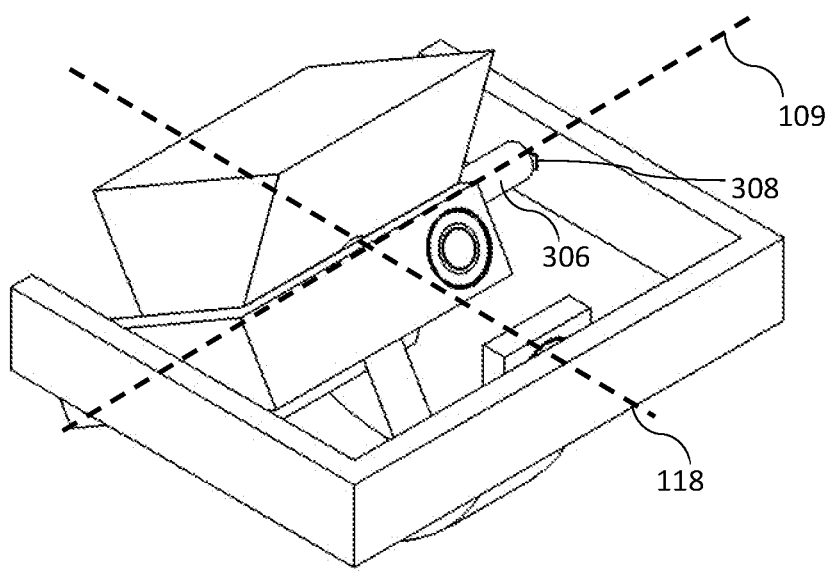
FIG. 3D shows another perspective view of the exemplary case of FIG. 3C.

FIGS. 3A-D show yet another embodiment of a rotation mechanism disclosed herein and numbered 300. Rotation mechanism 300 is similar to mechanism 100, with identical parts in both mechanisms numbered with identical numerals. Relative to mechanism 100, mechanism 300 is equipped with two position sensing mechanisms, enabling determining a relative position (orientation/rotation) of payload 102 relative to frame 104 in two DOF. The position sensing mechanisms comprise at least one pair of a magnet and a Hall sensor. In some embodiments, a position sensing mechanism may comprise more than one magnet and/or more than one Hall sensor. FIG. 3A shows a perspective view of mechanism 300, and FIG. 3B shows a top view. Mechanism 300 comprises a first magnet 302 rigidly coupled to first rotation arm 106 and a first Hall sensor 304 rigidly coupled to base 104. Mechanism 300 further comprises a second magnet 306 rigidly coupled to payload 102, and a second Hall sensor 308 rigidly coupled to base 104. In an example, the position of the second Hall sensor is on first rotation axis 109. In an example, Hall sensors 304 and 308 can measure the intensity of the magnetic field in the Y direction. In particular, first Hall sensor 304 is positioned close to first magnet 302 and can measure the intensity of the magnetic field of first magnet 302, which can be correlated with the rotation of the payload around the first DOF. Second Hall sensor 308 is positioned close to second magnet 306 and can measure the intensity of the magnetic field of second magnet 306, which can be correlated with the rotation of the payload around the second DOF. FIGS. 3C and 3D show, from two different perspective views, an exemplary case where the first rotation arm 106 is rotated around the first DOF (e.g. in 30 degrees). The relative position of first magnet 302 and first Hall bar 304 is changed, while the relative position of second magnet 306 and second Hall bar 308 is unchanged. Similarly, when rotating payload 102 around the second DOF using second rotation arm 108, the relative position of first magnet 302 and first Hall bar 304 is unchanged, while the relative position of second magnet 306 and second Hall bar 308 is changed. Thus the measurements of the two DOFs are decoupled from each other.

In summary, disclosed above are rotation mechanisms having a design with at least the following advantages:

Ability to rotate around two degrees of freedom.

The motors are stationary.

Only three mechanical connection points (bearings) are used to create the rotation, compared with at least four bearings in other designs in which the motors are stationary, for example in "Dynamic modeling and base inertial parameters determination of a 2-DOF spherical parallel mechanism" Danaei, B. et al., Multibody Syst. Dyn. (2017) 41: 367, doi:10.1007/s11044-017-9578-3, and "Optimal Design of Spherical 5R Parallel Manipulators Considering the Motion/Force Transmissibility", Chao Wu et al., J. Mech. Des. (2010) 132(3), doi: 10.1115/1.4001129.

While this disclosure describes a limited number of embodiments, it will be appreciated that many variations, modifications and other applications of such embodiments may be made. For example, the magnetic follower can be replaced with a mechanical follower.

In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A rotation mechanism for rotating a payload in two, first and second degrees of freedom (DOF), comprising:
    a) a static base;
    b) a first rotation arm coupled mechanically to the static base through a first rotation joint and used for rotating the payload relative to the static base around a first rotation axis that passes through the first rotation joint;
    c) a second rotation arm coupled mechanically to the static base through a second rotation joint and used for rotating the payload relative to the static base around a second rotation axis that passes through the second rotation joint; and
    d) a follower member rigidly coupled to the payload and arranged to keep a constant distance from the second rotation arm,
        wherein the rotation of the first arm rotates the payload around the first DOF and wherein the rotation of the second arm rotates the payload around the second DOF.

2. The rotation mechanism of claim 1, wherein the payload is coupled mechanically to the first rotation arm through an inner rotation joint.

3. The rotation mechanism of claim 1, further comprising a first motor for rotating the payload relative to the static base around the first rotation axis and a second motor for rotating the payload relative to the static base around the second rotation axis, wherein the first and second motors are rigidly attached to the static base.

4. The rotation mechanism of claim 1, wherein the follower member is a magnetic member separated from the second rotation arm by a constant air-gap.

5. The rotation mechanism of claim 2, further comprising a first motor for rotating the payload relative to the static base around the first rotation axis and a second motor for rotating the payload relative to the static base around the second rotation axis, wherein the first and second motors are rigidly attached to the static base.

6. The rotation mechanism of claim 2, wherein the follower member is a magnetic member separated from the second rotation arm by a constant air-gap.

7. The rotation mechanism of claim 3, wherein the follower member is a magnetic member separated from the second rotation arm by a constant air-gap.

8. The rotation mechanism of claim 1, wherein the second rotation arm includes a ring section centered around the first rotation axis.

9. The rotation mechanism of claim 1, further comprising at least one sensing mechanism for determining a position of the payload.

10. The rotation mechanism of claim 9, wherein the at least one sensing mechanism comprises at least one pair of a magnet and a Hall sensor.

11. The rotation mechanism of claim 9, wherein the at least one sensing mechanism is operable to determine a position of the payload relative to the static base in the first and second DOFs.

12. The rotation mechanism of claim 10, wherein the at least one pair of a magnet and a Hall sensor comprises a first pair of a magnet and a Hall sensor that allows determination of a rotation of the payload around the first DOF, and a second pair of a magnet and a Hall sensor that allows determination of a rotation of the payload around the second DOF.

13. The rotation mechanism of claim 11, wherein the determinations of the position of the payload relative to the static base in the two DOFs are decoupled from each other.

* * * * *